United States Patent
Adrian

(10) Patent No.: US 10,372,360 B2
(45) Date of Patent: Aug. 6, 2019

(54) APPARATUS, SYSTEM, AND METHOD FOR RECONFIGURABLE MEDIA-AGNOSTIC STORAGE

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 18 days.

(21) Appl. No.: 15/694,068

(22) Filed: Sep. 1, 2017

(65) Prior Publication Data

US 2019/0073148 A1    Mar. 7, 2019

(51) Int. Cl.
  *G06F 3/06*    (2006.01)
  *G06F 13/40*   (2006.01)

(52) U.S. Cl.
  CPC .......... *G06F 3/0629* (2013.01); *G06F 3/0613* (2013.01); *G06F 3/0685* (2013.01); *G06F 13/4068* (2013.01)

(58) Field of Classification Search
  None
  See application file for complete search history.

(56) References Cited

U.S. PATENT DOCUMENTS

| | | |
|---|---|---|
| 3,996,500 A | 12/1976 | Coules |
| D294,800 S | 3/1988 | Nilsson |
| 4,969,065 A | 11/1990 | Petri |
| 5,281,149 A | 1/1994 | Petri |
| 5,724,803 A | 3/1998 | Pea |
| 5,793,614 A | 8/1998 | Tollbom |
| 5,957,659 A | 9/1999 | Amou |
| 6,109,767 A | 8/2000 | Rodriguez |
| 6,116,375 A | 9/2000 | Lorch |
| 6,159,031 A | 12/2000 | Llapitan |
| 6,181,549 B1 | 1/2001 | Mills |
| 6,404,646 B1 | 6/2002 | Tsai |

(Continued)

OTHER PUBLICATIONS

Jason David Adrian; An Apparatus, System, and Method for Reconfiguring Air Flow Through a Chassis; U.S. Appl. No. 15/716,251, filed Sep. 26, 2017.

(Continued)

*Primary Examiner* — Henry Tsai
*Assistant Examiner* — Aurangzeb Hassan
(74) *Attorney, Agent, or Firm* — FisherBroyles, LLP

(57) ABSTRACT

A storage-media-agnostic chassis apparatus may include a media-agnostic storage bay that (1) is adapted to house media storage devices of a plurality of different media storage device types with different physical dimensions, (2) is reconfigurable via removing at least one media storage device of a media storage device type from the media-agnostic storage bay and inserting at least one media storage device of an additional media storage device type, (3) is dimensioned to simultaneously store a plurality of media storage devices, and (4) comprises a plurality of connectors adapted to simultaneously connect to the media storage devices. The apparatus may also include a storage controller card, a compute module that is separate from but removably attached to the media-agnostic storage bay, and a backplane that facilitates communication between the media storage device and the compute module. Various other methods, systems, and apparatuses are also disclosed.

20 Claims, 15 Drawing Sheets

(56) References Cited

U.S. PATENT DOCUMENTS

| | | |
|---|---|---|
| 6,469,899 B2 | 10/2002 | Hastings |
| 6,515,854 B1 | 2/2003 | Claprood |
| 6,621,692 B1 | 9/2003 | Johnson |
| 6,791,843 B1 | 9/2004 | Dobbs |
| 6,798,669 B1 | 9/2004 | Hsu |
| 6,813,165 B2 | 11/2004 | Cheng |
| 6,987,674 B2 | 1/2006 | El-Batal |
| 6,995,982 B2 | 2/2006 | Gonzalez |
| 7,004,764 B2 | 2/2006 | Boudreau |
| 7,084,654 B2 | 8/2006 | Zhao |
| 7,088,579 B1 | 8/2006 | Konshak |
| 7,167,371 B2 | 1/2007 | Coles |
| 7,301,778 B1 | 11/2007 | Fang |
| 7,411,787 B2 | 8/2008 | Katakura |
| 7,505,286 B2 | 3/2009 | Brovald |
| 7,515,413 B1 | 4/2009 | Curtis |
| 7,649,750 B2 | 1/2010 | Lee |
| 8,020,902 B1 | 9/2011 | Li |
| 8,310,828 B2 | 11/2012 | Collins |
| 8,570,720 B2 | 10/2013 | Yao |
| 8,657,619 B2 | 2/2014 | Lin |
| 8,749,966 B1 | 6/2014 | Boudreau |
| 8,848,349 B2 | 9/2014 | Ke |
| 8,944,538 B2 | 2/2015 | Li |
| 8,971,052 B2 | 3/2015 | Fu |
| 9,066,438 B2 | 6/2015 | Chen |
| 9,070,419 B1 | 6/2015 | Zhu |
| 9,098,233 B2 | 8/2015 | Keffeler |
| 9,101,210 B2 | 8/2015 | Lin |
| 9,203,188 B1 | 12/2015 | Siechen |
| 9,354,003 B2 | 5/2016 | Lin |
| 9,456,519 B2 | 9/2016 | Bailey |
| 9,461,389 B2 | 10/2016 | Novack |
| 9,538,684 B2 | 1/2017 | Chen |
| 9,545,028 B2 | 1/2017 | Hoshino |
| 9,572,276 B2 | 2/2017 | Haroun |
| 9,583,877 B1 | 2/2017 | Angelucci |
| 9,609,778 B1 | 3/2017 | Spencer |
| 9,763,350 B2 | 9/2017 | Rust |
| 9,795,052 B2 | 10/2017 | Hsiao |
| 2003/0183448 A1 | 10/2003 | Van Sleet |
| 2003/0200475 A1* | 10/2003 | Komoto ............... G06F 13/4072 713/400 |
| 2005/0057909 A1* | 3/2005 | El-Batal ............... G11B 25/043 361/796 |
| 2005/0238421 A1 | 10/2005 | Doerr |
| 2006/0134953 A1 | 6/2006 | Williams |
| 2006/0274508 A1 | 12/2006 | Lariviere |
| 2007/0195542 A1 | 8/2007 | Metros |
| 2007/0230111 A1 | 10/2007 | Starr |
| 2007/0233781 A1* | 10/2007 | Starr .................... G11B 33/126 709/203 |
| 2008/0007913 A1 | 1/2008 | Tavassoli |
| 2008/0117569 A1 | 5/2008 | Lee |
| 2009/0245745 A1 | 10/2009 | Krampotich |
| 2009/0271950 A1 | 11/2009 | Wang |
| 2009/0274429 A1 | 11/2009 | Krampotich |
| 2009/0310303 A1 | 12/2009 | Najbert |
| 2010/0195304 A1 | 8/2010 | Takao |
| 2010/0296791 A1 | 11/2010 | Makrides-Saravanos |
| 2011/0273850 A1 | 11/2011 | Chen |
| 2011/0309730 A1 | 12/2011 | Retchloff |
| 2012/0004772 A1 | 1/2012 | Rahilly |
| 2012/0020006 A1 | 1/2012 | Xu |
| 2012/0134086 A1 | 5/2012 | Zhang |
| 2012/0230815 A1 | 9/2012 | Teramoto |
| 2012/0257360 A1 | 10/2012 | Sun |
| 2012/0305745 A1 | 12/2012 | Chen |
| 2013/0058054 A1 | 3/2013 | Zhou |
| 2013/0258580 A1 | 10/2013 | Nakayama |
| 2013/0325183 A1 | 12/2013 | Rahilly |
| 2014/0111930 A1 | 4/2014 | Henderson |
| 2014/0187068 A1 | 7/2014 | Chia |
| 2014/0191636 A1 | 7/2014 | Li |
| 2014/0369002 A1 | 12/2014 | Takeuchi |
| 2015/0156912 A1 | 6/2015 | Liang |
| 2015/0163946 A1 | 6/2015 | Kyle |
| 2015/0208548 A1 | 7/2015 | Chu |
| 2015/0235673 A1 | 8/2015 | Lo |
| 2016/0150659 A1 | 5/2016 | Chen |
| 2016/0150667 A1 | 5/2016 | Xu |
| 2016/0330858 A1 | 11/2016 | Ehlen |

OTHER PUBLICATIONS

Jason Adrian; Introducing Bryce Canyon: Our next-generation storage platform; https://code.facebook.com/posts/1869788206569924/introducing-bryce-canyon-our-next-generation-storage-platform/; Mar. 8, 2017.

Jason Adrian et al.; Bryce Canyon Storage Specification; Jan. 31, 2017.

Open Compute Project; http://opencompute.org/; as accessed Sep. 29, 2017.

Jason David Adrian; Data-Center Drawer and Cable Track Assembly; U.S. Appl. No. 15/720,647, filed Sep. 29, 2017.

Bisson; How Facebook Does Storage; https://thenewstack.io/facebook-storage.

What's the Difference Between SATA and SAS Hard Drives?; https://www.pickaweb.co.uk/kb/difference-between-sata-sas-hard-drives/.

Chuankeat Kho; Apparatus, System, and Method for Securing Computing Components to Printed Circuit Boards; U.S. Appl. No. 15/713,607, filed Sep. 23, 2017.

Chuankeat Kho et al.; Apparatus, System, and Method for Partitioning a Storage-System Chassis; U.S. Appl. No. 15/708,069, filed Sep. 18, 2017.

Chuankeat Kho et al.; Apparatus, System, and Method for Dampening Vibrations Generated by Exhaust Fans; U.S. Appl. No. 15/713,609, filed Sep. 23, 2017.

Chuankeat Kho et al.; Apparatus, System, and Method for Resisting Shock to a Data-Center Rack; U.S. Appl. No. 15/708,075, filed Sep. 18, 2017.

Acoustic Attenuation; https://en.wikipedia.org/wiki/Acoustic_attenuation; Oct. 22, 2012.

Electromagnetic Shielding; https://en.wikipedia.org/wiki/Electromagnetic_shielding; May 15, 2016.

Jason David Adrian; Apparatus, System, and Method for Indicating the Status of and Securing Hard Drives; U.S. Appl. No. 15/700,112, filed Sep. 9, 2017.

Jason David Adrian; Apparatus, System, and Method for Directing Air in a Storage-System Chassis; U.S. Appl. No. 15/689,650, filed Aug. 29, 2017.

Jason David Adrian et al.; Apparatus, System, and Method for Enabling Multiple Storage-System Configurations; U.S. Appl. No. 15/688,830, filed Aug. 28, 2017.

Jason David Adrian et al.; Apparatus, System, and Method for Securing Hard Drives in a Storage Chassis; U.S. Appl. No. 15/697,405, filed Sep. 6, 2017.

Jason David Adrian; Apparatus, System, and Method for Detecting Device Types of Storage Devices; U.S. Appl. No. 15/698,540, filed Sep. 7, 2017.

Chuankeat Kho et al.; Removeable Drive-Plane Apparatus, System, and Method; U.S. Appl. No. 15/693,362, filed Aug. 31, 2017.

Chuankeat Kho et al.; Systems and Methods for Mounting Assembly Pull-Handles; U.S. Appl. No. 15/687,406, filed Aug. 25, 2017.

* cited by examiner

APPARATUS, SYSTEM, AND METHOD FOR RECONFIGURABLE MEDIA-AGNOSTIC STORAGE

BACKGROUND

The first computer hard drive ever shipped had a capacity of five megabytes. Now, thousands and thousands of megabytes of data are being generated every day. Everything from text to pictures to videos is being stored to storage drives, often remotely via the cloud. A website that allows users to upload media must store vast amounts of data in servers. This storage burden is further increased by the fact that many organizations create and store duplicate copies of code and data for disaster-recovery, testing, regulatory, or other purposes. Some organizations outsource this responsibility while other organizations manage their own data centers full of servers and storage devices.

Fortunately, storage technology is keeping pace with the demand for storage space, at least for now. New servers and storage drives are released on a regular basis to store and retrieve data more efficiently. Unfortunately, these new devices are often incompatible with older hardware. Some new devices may even be incompatible with older infrastructure such as server racks if the form factor of the new device is significantly different from its predecessor. An improvement to the devices used to house media storage devices can create a tremendous improvement in efficiency for data center operators.

SUMMARY

As will be described in greater detail below, the instant disclosure describes various apparatuses, systems, and methods for reconfigurable media-agnostic storage that include a media-agnostic storage bay and various controllers capable of housing and interfacing with media storage of a wide variety of types, formats, and physical dimensions.

In one embodiment, an apparatus for a storage-media-agnostic chassis may include a media-agnostic storage bay that (i) is adapted to house media storage devices of a group of different media storage device types with different physical dimensions, (ii) is reconfigurable via removing at least one media storage device of a media storage device type from the media-agnostic storage bay and inserting at least one media storage device of an additional media storage device type into the media-agnostic storage bay, (iii) is dimensioned to simultaneously store a group of media storage devices, and (iv) is adapted to house a group of connectors adapted to simultaneously connect to the media storage devices. The apparatus may also include (i) a storage controller card adapted to control at least one media storage device housed in the media-agnostic storage bay, (ii) a compute module that is separate from but removably attached to the media-agnostic storage bay and that is connected to the storage controller card, and (iii) a backplane that connects to the media storage device housed in the media-agnostic storage bay and to the compute module via at least one connector that facilitates communication between the media storage device housed in the media-agnostic storage bay and the compute module.

In one embodiment, the media-agnostic storage bay may be adapted to simultaneously house media storage devices of a group of different media storage device types with different physical dimensions. In one embodiment, the apparatus may include an input/output module adapted to manage at least one configuration of media storage devices held within the media-agnostic storage bay.

In some embodiments, the apparatus may further include a device-holding module that is adapted to hold a group of media storage devices in a predetermined configuration within the media-agnostic storage bay. In some examples, the device-holding module may be adapted to hold media storage devices of a specific media storage device type within the different media storage device types. In one embodiment, the device-holding module may contain a non-conductive fluid. In some embodiments, the device-holding module may include at least one latch adapted to hold a single media storage device in place when closed and enable removal of the single media storage device when open.

In one embodiment, the storage controller card may be configured to control a specific type of media storage device. In some embodiments, the media-agnostic storage bay may be adapted to enable the media storage device housed in the media-agnostic storage bay to be removed from the media-agnostic storage bay without the media storage device housed in the media-agnostic storage bay being powered down. In some examples, the media storage device housed in the media-agnostic storage bay may include a flash storage device. In some embodiments, the apparatus may include at least one drive plane board connected to the media storage device housed in the media-agnostic storage bay, the storage controller card, the compute module, and at least one fan module.

In one example, a system for a storage-media-agnostic chassis may include (i) a media-agnostic storage bay that (a) is adapted to house media storage devices of a group of different media storage device types with different physical dimensions, (b) is reconfigurable via removing at least one media storage device of a media storage device type from the media-agnostic storage bay and inserting at least one media storage device of an additional media storage device type into the media-agnostic storage bay, (c) is dimensioned to simultaneously store a group of media storage devices, and (d) is adapted to house a group of connectors adapted to simultaneously connect to the media storage devices, (ii) a storage controller card adapted to control at least one media storage device housed in the media-agnostic storage bay, (iii) a compute module that is separate from but removably attached to the media-agnostic storage bay and that is connected to the storage controller card, and (iv) a backplane that connects to the media storage device housed in the media-agnostic storage bay and to the compute module via at least one connector that facilitates communication between the media storage device housed in the media-agnostic storage bay and the compute module. The system may also include a rack adapted to house the storage-media-agnostic chassis and at least one cable adapted to provide at least one of power or network connectivity to the storage-media-agnostic chassis.

In one embodiment, the system may include a device-holding module that is adapted to hold a group of media storage devices in a predetermined configuration within the media-agnostic storage bay and interface with the media-agnostic storage bay such that each media storage device held by the device-holding module is connected to the backplane via at least one connector. Additionally or alternatively, the system may include an input/output module that includes the storage controller card and the compute module.

In addition, a corresponding method for assembling storage-media-agnostic chasses may include assembling a storage-media-agnostic chassis by attaching, to a drive plane board, a media-agnostic storage bay that (i) is adapted to house media storage devices of a group of different media storage device types with different physical dimensions, (ii) is reconfigurable via removing at least one media storage device of a media storage device type from the media-agnostic storage bay and inserting at least one media storage device of an additional media storage device type into the media-agnostic storage bay, (iii) is dimensioned to simultaneously store a group of media storage devices, and (iv) is adapted to house a group of connectors adapted to simultaneously connect to the media storage devices. The method may also include attaching, to the drive plane board, a storage controller card adapted to control at least one media storage device housed in the media-agnostic storage bay and a compute module that is separate from the media-agnostic storage bay. The method may also include connecting the compute module to the storage controller card.

In some examples, the method may further include reconfiguring the media-agnostic storage bay by removing at least one media storage device of a media storage device type from the media-agnostic storage bay and inserting at least one media storage device of an additional media storage device type into the media-agnostic storage bay. In one example, reconfiguring the media-agnostic storage bay may include removing a device-holding module that holds the at least one media storage device of the media storage device type in a predefined configuration and inserting an additional device-holding module that holds the at least one media storage device of the additional media storage device type in an additional predefined configuration.

Additionally or alternatively, reconfiguring the media-agnostic storage bay may include (i) configuring a device-holding module to hold a set of media storage devices in a predefined physical arrangement, (ii) inserting the set of media storage devices into the device-holding module in the predefined physical arrangement, and (iii) inserting the device-holding module into the media-agnostic storage bay. In some examples, reconfiguring the media-agnostic storage bay may include reconfiguring a storage controller card adapted to control at least one media storage device housed in the media-agnostic storage bay to control the media storage device of the additional media storage device type. In one embodiment, reconfiguring the media-agnostic storage bay may include reconfiguring an input/output module to manage a configuration of media storage devices held within the media-agnostic storage bay that may include the media storage device of the additional media storage device type.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
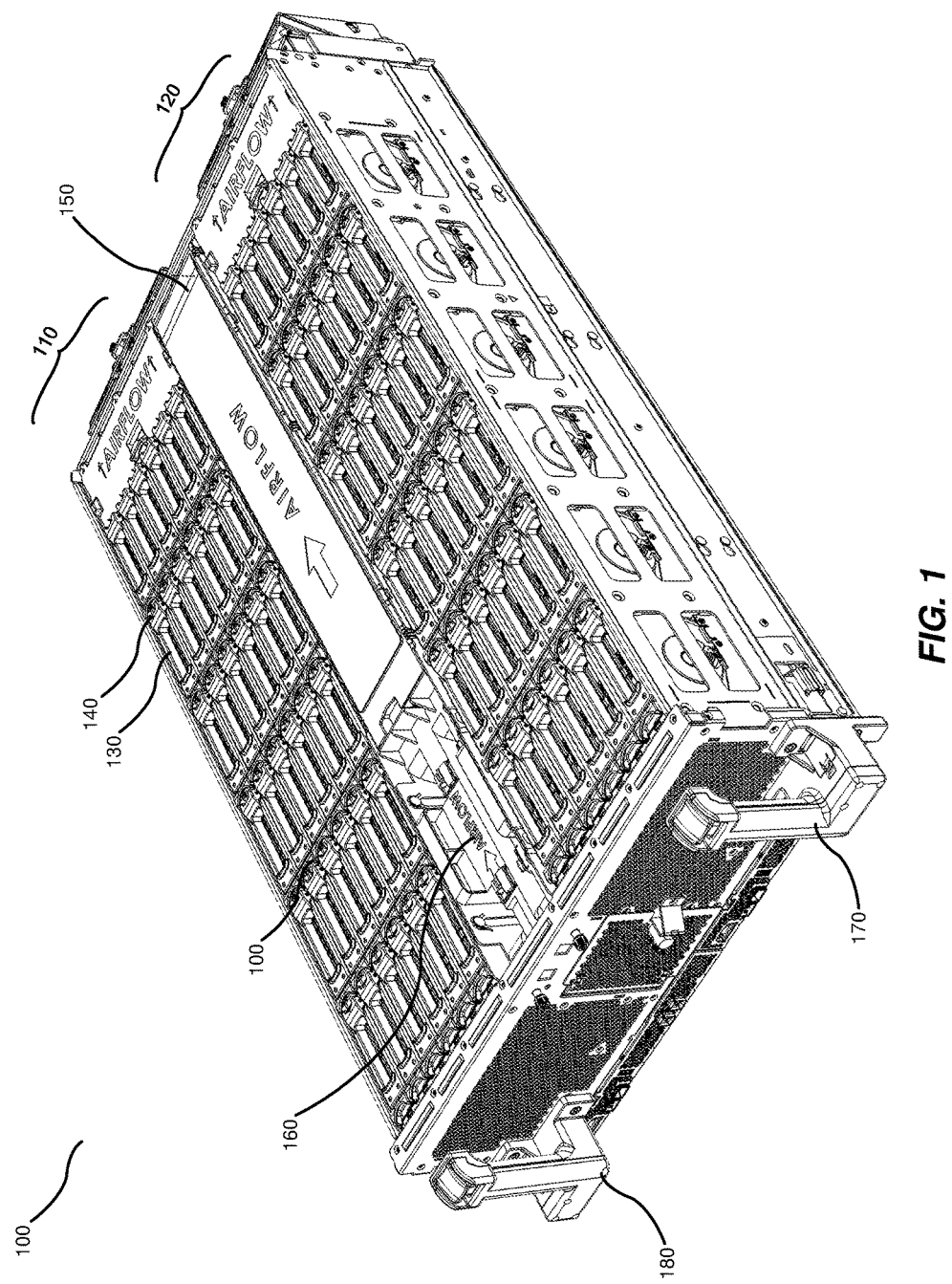
FIG. 1 is an isometric view of an exemplary storage-media-agnostic chassis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to various apparatuses, systems, and methods for reconfigurable media-agnostic storage. As will be explained in greater detail below, embodiments of the instant disclosure may provide various features and advantages over conventional approaches to housing media storage devices. For example, the configurations disclosed herein may allow for storage devices to be replaced by storage devices of other types, formats, and/or form factors without requiring the purchase or configuration of entirely new chassis hardware and/or the reconfiguration of data center racks. In addition, the mechanisms disclosed herein may facilitate more efficient management of data center facilities. For example, the mechanisms disclosed herein may enable data center administrators to reconfigure chasses to meet changing needs by simply replacing storage devices rather than replacing entire chasses or racks. In addition, the mechanisms described herein may enable storage devices to be housed more efficiently in chasses by enabling the storage devices to be arranged in different configurations based on the power, cooling, and/or other needs of the particular storage device type.

Figure 2:
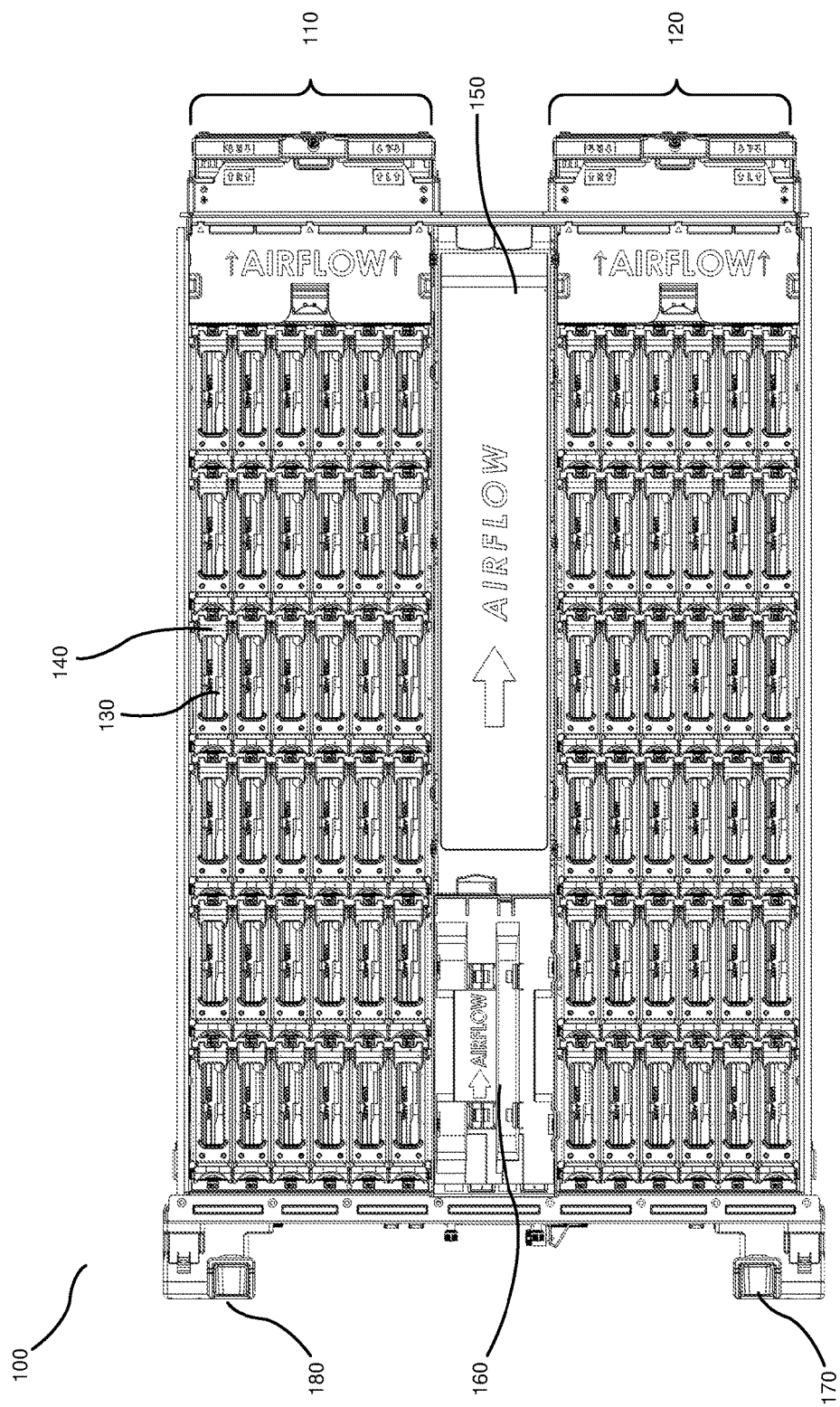
FIG. 2 is a top view of an exemplary storage-media-agnostic chassis.

The following will provide, with reference to FIGS. 1-2, detailed descriptions of an example storage-media-agnostic chassis. Detailed descriptions of example modules will be provided in connection with FIGS. 3-6. Detailed descriptions of an example drive removal system will be provided in connection with FIG. 7. Additionally, detailed descriptions of example server configurations for a storage-media-agnostic chassis will be provided in connection with FIGS. 8-10. Detailed descriptions of a storage controller card and input/output module will be provided in connection with FIGS. 11 and 12, respectively. Detailed descriptions of an alternative example storage-media-agnostic chassis embodiment will be provided in connection with FIGS. 13, 14A, 14B, and 14C. Detailed descriptions of an example method for assembling storage-media-agnostic chasses will be provided in connection with FIG. 15.

FIG. 1 shows an isometric view of a storage-media-agnostic chassis 100. The term "storage-media-agnostic chassis," as used herein, generally refers to any structure that is adapted to house and provide power and cooling to media storage drives that may be any of a variety of types of media storage drive with any of a variety of physical dimensions. In some embodiments, a storage-media-agnostic chassis may be adapted to be housed in a data center rack. In one embodiment, a storage-media-agnostic chassis may be adapted to manage the configuration of drives housed within the storage-media-agnostic chassis and/or provide network connectivity to drives housed within the storage-media-agnostic chassis.

As illustrated in FIG. 1, storage-media-agnostic chassis 100 may include a media-agnostic storage bay 110 and/or a media-agnostic storage bay 120. The term "media-agnostic storage bay," as used herein, generally refers to space within a chassis that is adapted to store one or more media storage drives of a variety of types. In some embodiments, media-agnostic storage bay 110 may include one or more media storage drives 130. The term "media storage device" and/or "drive," as used herein, generally refers to any device capable of storing electronic data. In some embodiments, a media storage drive may include flash storage. Examples of media storage drives may include, without limitation, solid state drives, hard disk drives, and/or optical drives. The term "media storage drive type," as used herein, generally refers to any defining characteristic of a media storage drive. In some examples, a media storage drive type may include a physical form factor of a media storage drive. In some examples, a media storage drive type may include a type of storage used by the drive (e.g., solid state or hard disk). In some examples, a media storage drive type may include a serial protocol and/or type of connector used by a drive. Additionally or alternatively, a media storage drive type may include a specific brand and/or product line of the media storage drive. In some examples, a media storage drive type may be a serial attached small computer system interface (SAS) drive. In some examples, a media storage drive type may be a serial advanced technology attachment (SATA) drive. In one example, a media storage drive type may be an M.2 drive.

In one embodiment, media storage drive 130 may be secured by a latch 140 adapted to hold media storage drive 130 in place when closed and enable removal of media storage drive 130 when open. In some embodiments, storage-media-agnostic chassis 100 may include a removable cover 150 and/or a removable cover 160 that may cover other components of storage-media-agnostic chassis 100, such as a compute module, a storage controller card, and/or cables. In some examples, removable covers 150 and 160 may improve airflow within storage-media-agnostic chassis 100 by preventing cooled air from escaping. In one embodiment, storage-media-agnostic chassis 100 may have handle 170 and/or handle 180 that enable a drawer portion of storage-media-agnostic chassis 100 to be easily grasped by a technician and opened or closed. In some embodiments, the form factor of storage-media-agnostic chassis 100 may be designed to fit on a data center rack.

FIG. 2 shows a top view of storage-media-agnostic chassis 100. As illustrated in FIG. 2, media-agnostic storage bays 110 and 120 may each hold one or more media storage drives 130 that may each be secured by a latch 140. In some embodiments, removable covers 150 and/or 160 may cover various components of storage-media-agnostic chassis 100. In some embodiments, handles 170 and/or 180 may enable a drawer portion of storage-media-agnostic chassis 100 that includes media-agnostic storage bays 110 and 120 to be easily opened and closed by a technician.

Figure 3:
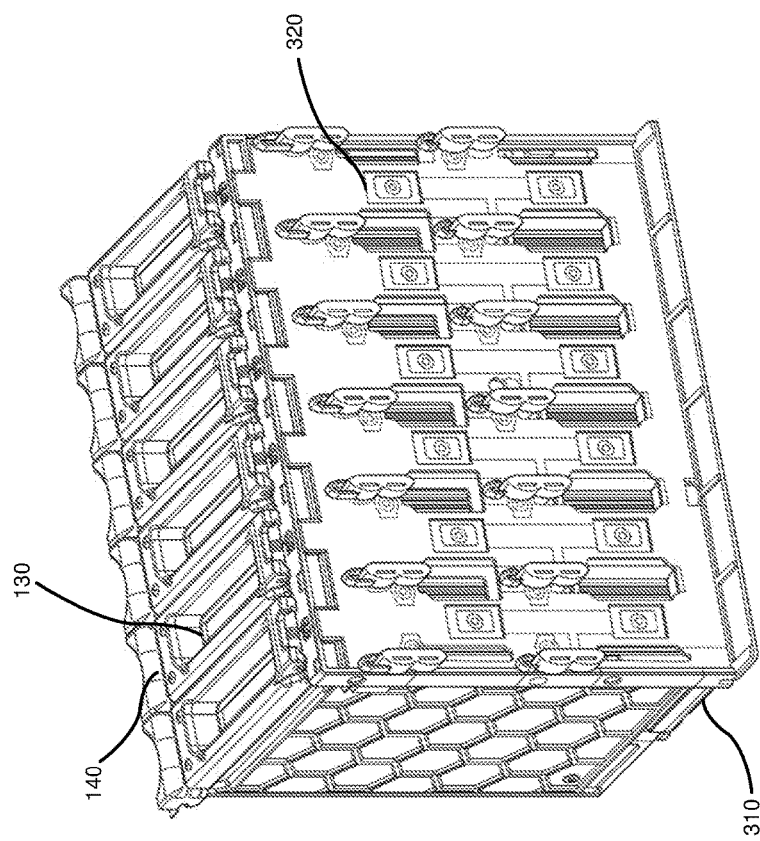
FIG. 3 is an isometric view of an exemplary device-holding module for a storage-media-agnostic chassis.

FIG. 3 shows a top view of a module 300 adapted to hold one or more media storage drives 130 in media-agnostic storage bay 110 or 120. In some embodiments, latch 140 may be part of module 300. In some embodiments, module 300 may include connectors 310 at the base of module 300 to enable drives held within module 300 to connect to a backplane of the media-agnostic storage bay that holds module 300. Additionally or alternatively, module 300 may include connectors 320 in one or more sides of module 300 to enable the drives held within module 300 to connect to a backplane of the media-agnostic storage bay and/or other components of the storage-media-agnostic chassis. In some embodiments, module 300 may house a connector and/or group of connectors adapted to simultaneously connect to multiple media storage devices held within module 300. For example, module 300 may house a PCIe switch, SAS controller, and/or SATA controller.

Figure 4:
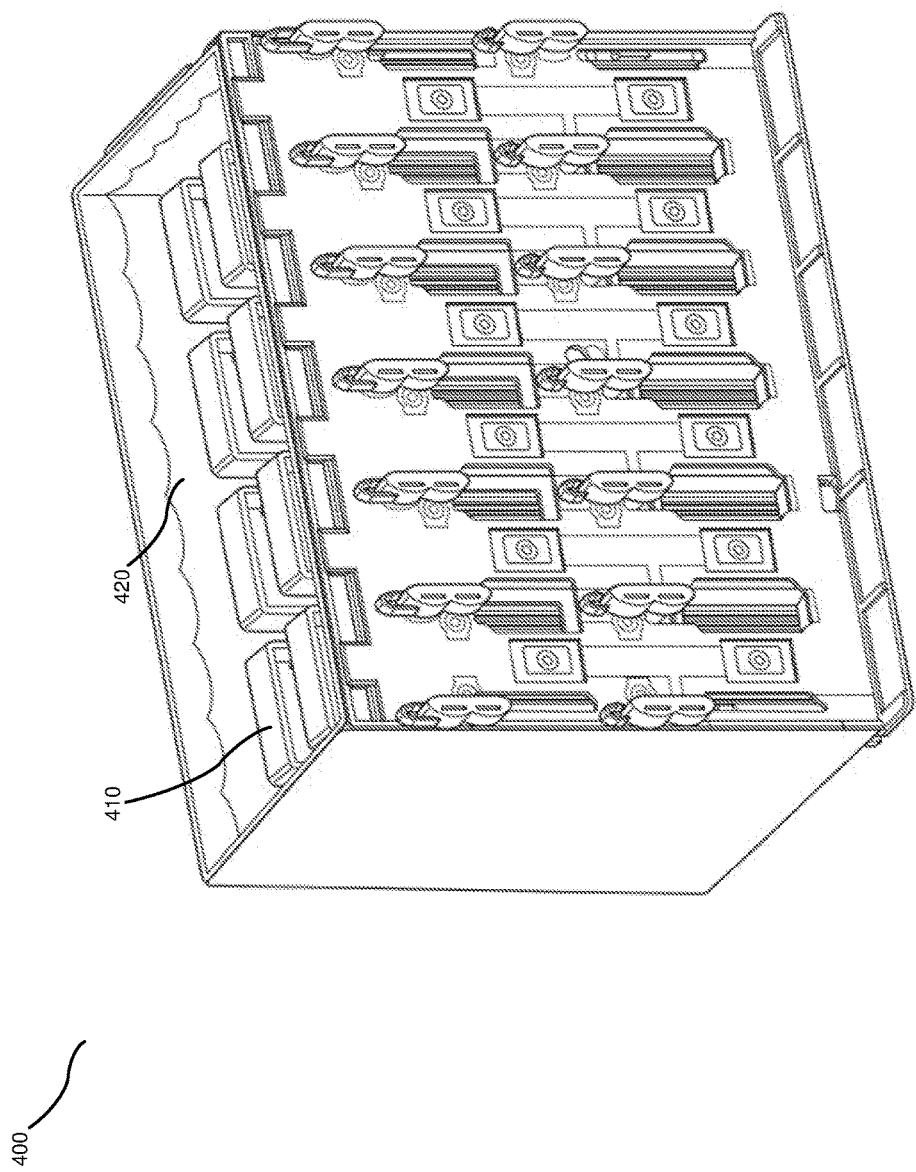
FIG. 4 is an isometric view of an additional exemplary device-holding module for a storage-media-agnostic chassis.

FIG. 4 shows a module 400 with a different physical arrangement of drives than module 300 in FIG. 3. As illustrated in FIG. 4, module 400 may hold one or more media storage drives 410. In some examples, media storage drive 410 may have different physical dimensions than media storage drives held in other physical arrangements. In one embodiment, module 400 may be filled with a non-conductive fluid 420 that may provide cooling to media storage drive 410.

The physical arrangements of the media storage drives in FIG. 3 and FIG. 4 are merely illustrative examples of possible physical arrangements of media storage drives held in modules that are designed to be held in media-agnostic storage bays. Many other physical arrangements of drives are possible. For example, a module adapted to hold drives with large physical dimensions may only hold two or three drives. In another example, a module adapted to hold drives with significant airflow and/or cooling requirements may hold drives with large gaps between the drives to facilitate airflow and/or cooling. Additionally or alternatively, a module adapted to hold drives with low airflow and/or cooling requirements may hold the drives in a densely packed arrangement with small or no gaps between the drives.

Module 300 and/or module 400 may have a variety of different physical dimensions. In one embodiment, a module may be dimensioned to occupy the entirety of a media-agnostic storage bay. In another embodiment, a module may be dimensioned such that multiple modules fit simultaneously in one media-agnostic storage bay. For example, six instances of module 300 may fit simultaneously in media-agnostic storage bay 110. In this example, each instance of module 300 may hold six drives, for a total of 72 drives held in storage-media-agnostic chassis 100 if both media-agnostic storage bay 110 and media-agnostic storage bay 120 are completely filled with modules that are completely filled with drives.

Figure 5:
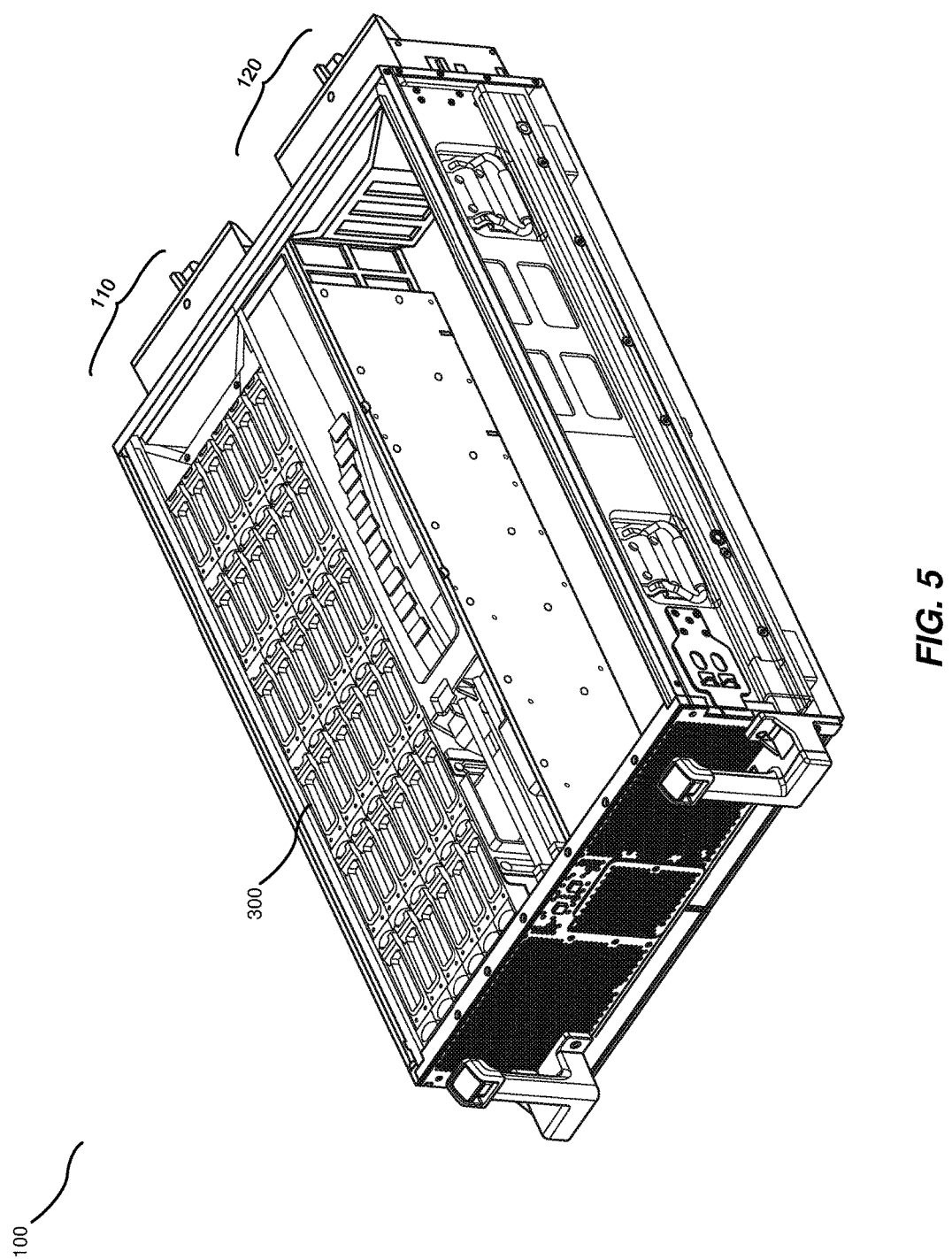
FIG. 5 is an isometric view of an exemplary storage-media-agnostic chassis with some modules removed.

FIG. 5 shows an isometric view of storage-media-agnostic chassis 100 with six instances of module 300 held in media-agnostic storage bay 110 while media-agnostic storage bay 120 is empty of modules. In some embodiments, storage-media-agnostic chassis 100 may be capable of managing and providing power and/or network connectivity to drives in one media-agnostic storage bay while the other media-agnostic storage bay is empty. In other embodiments, media-agnostic storage bays may only be empty while storage-media-agnostic chassis 100 is in the process of being reconfigured.

Figure 6:
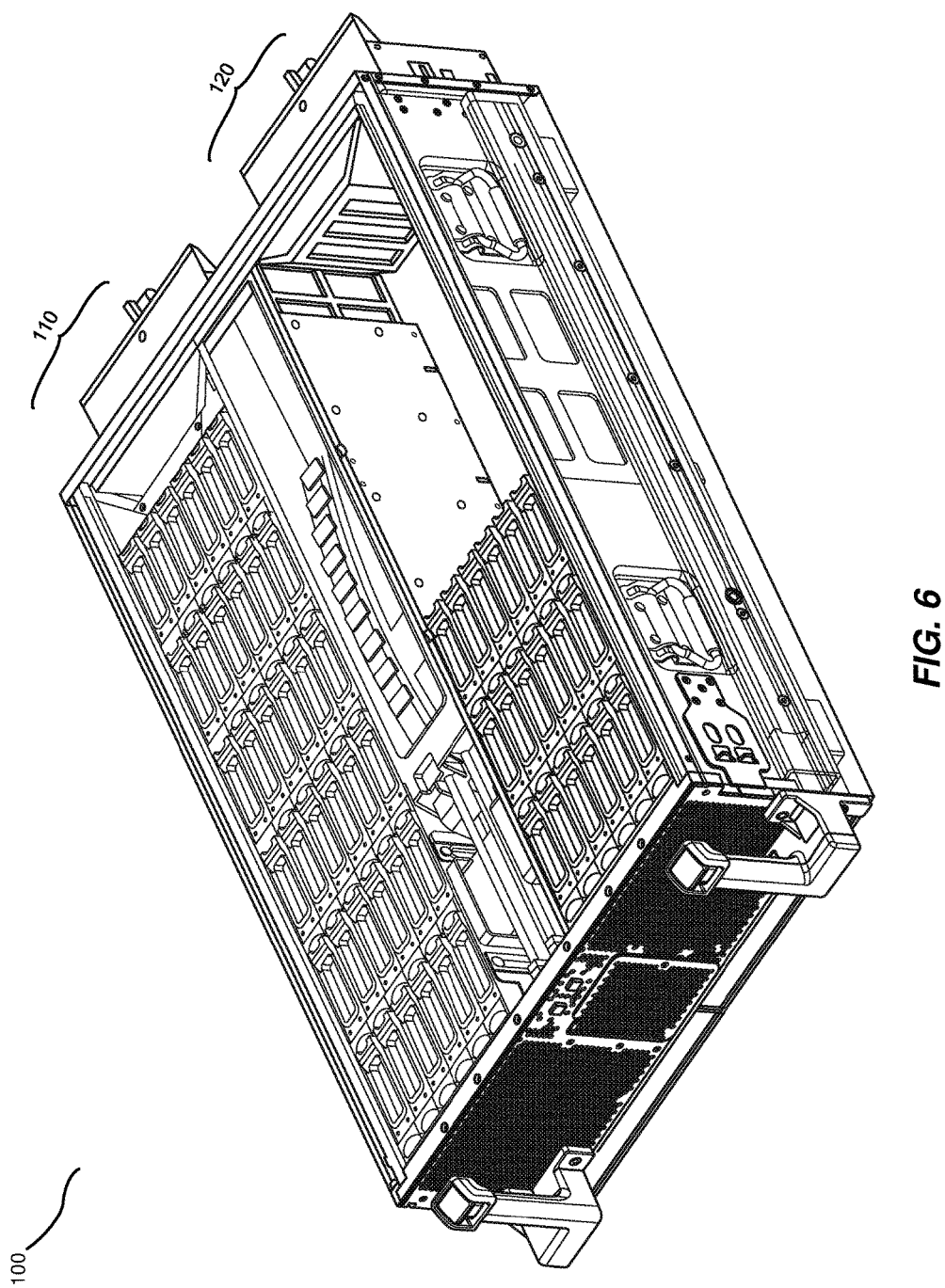
FIG. 6 is an isometric view of an exemplary storage-media-agnostic chassis with some modules being inserted.

FIG. 6 shows an isometric view of storage-media-agnostic chassis 100 while modules are inserted into media-agnostic storage bay 120. In some embodiments, media-agnostic storage bay 120 may be adapted to function while only partially full of modules. In one embodiment, media-agnostic storage bay 120 may provide power and/or network connectivity to drives within modules that are currently inserted into media-agnostic storage bay 120 even if some portion of media-agnostic storage bay 120 is not occupied by modules. In some examples, media-agnostic storage bay 120 may hold modules that are dimensioned such that the modules do not fill the entirety of media-agnostic storage bay 120. In one example, storage-media-agnostic chassis 100 may be configured with a server configuration that specifies a number of drives that does not fully occupy both media-agnostic storage bay 110 and media-agnostic storage bay 120. In some embodiments, media-agnostic storage bay 120 may be adapted to simultaneously hold modules of multiple different types and/or configurations.

Figure 7:
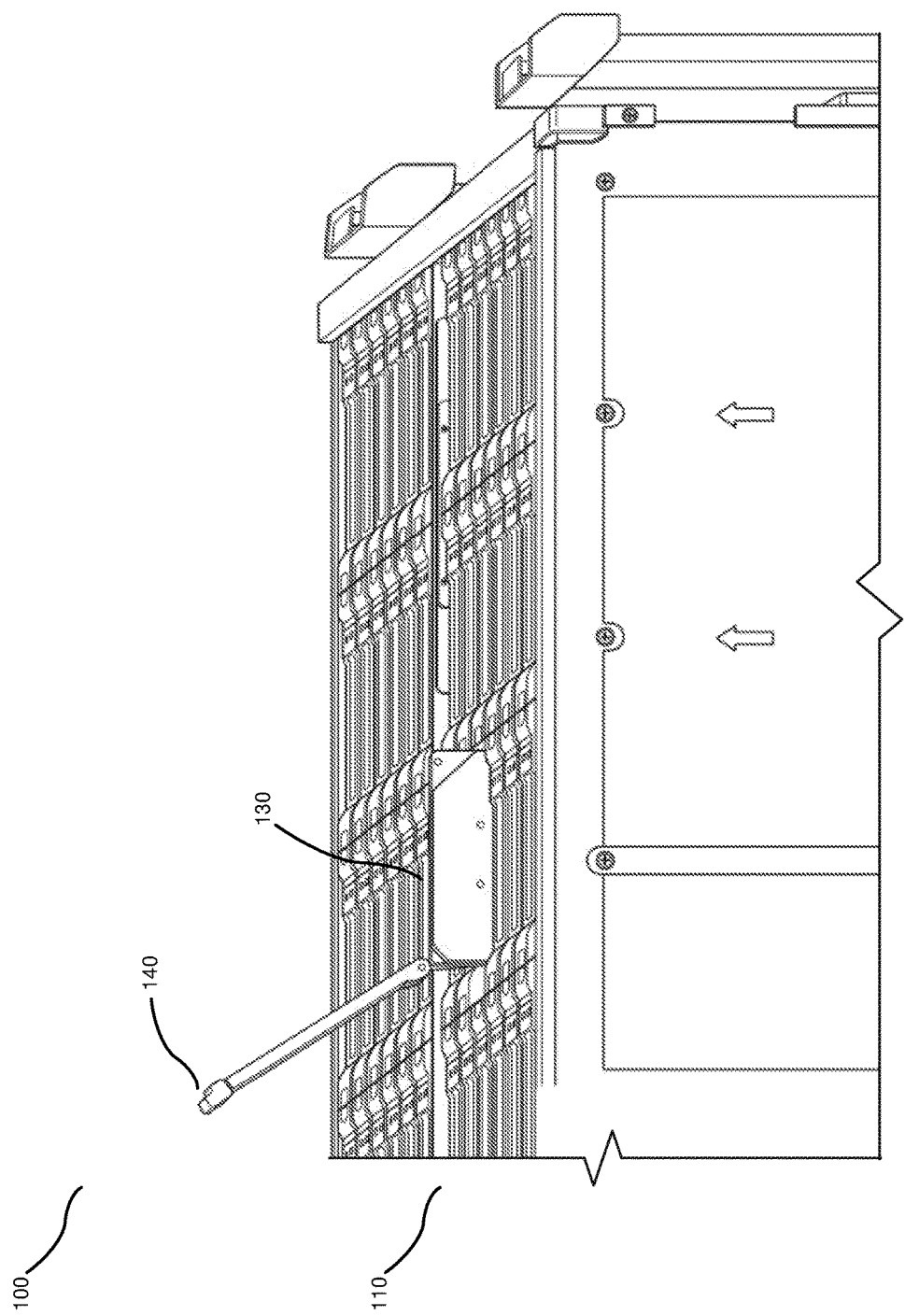
FIG. 7 is an isometric view of an exemplary drive removal system.

FIG. 7 shows a view of storage-media-agnostic chassis 100 while latch 140 is opened to enable the removal of media storage drive 130 from media-agnostic storage bay 110. In some embodiments, media-agnostic storage bay 110 may be adapted to enable media storage drive 130 to be removed from media-agnostic storage bay 110 without media storage drive 130 being powered down. In one embodiment, a hot swap controller may be connected to the backplane of media-agnostic storage bay 110 in order to enable media storage drive 130 to be inserted into and/or removed from media-agnostic storage bay 110 without either media storage drive 130 or media-agnostic storage bay 110 being powered down.

Figure 8:
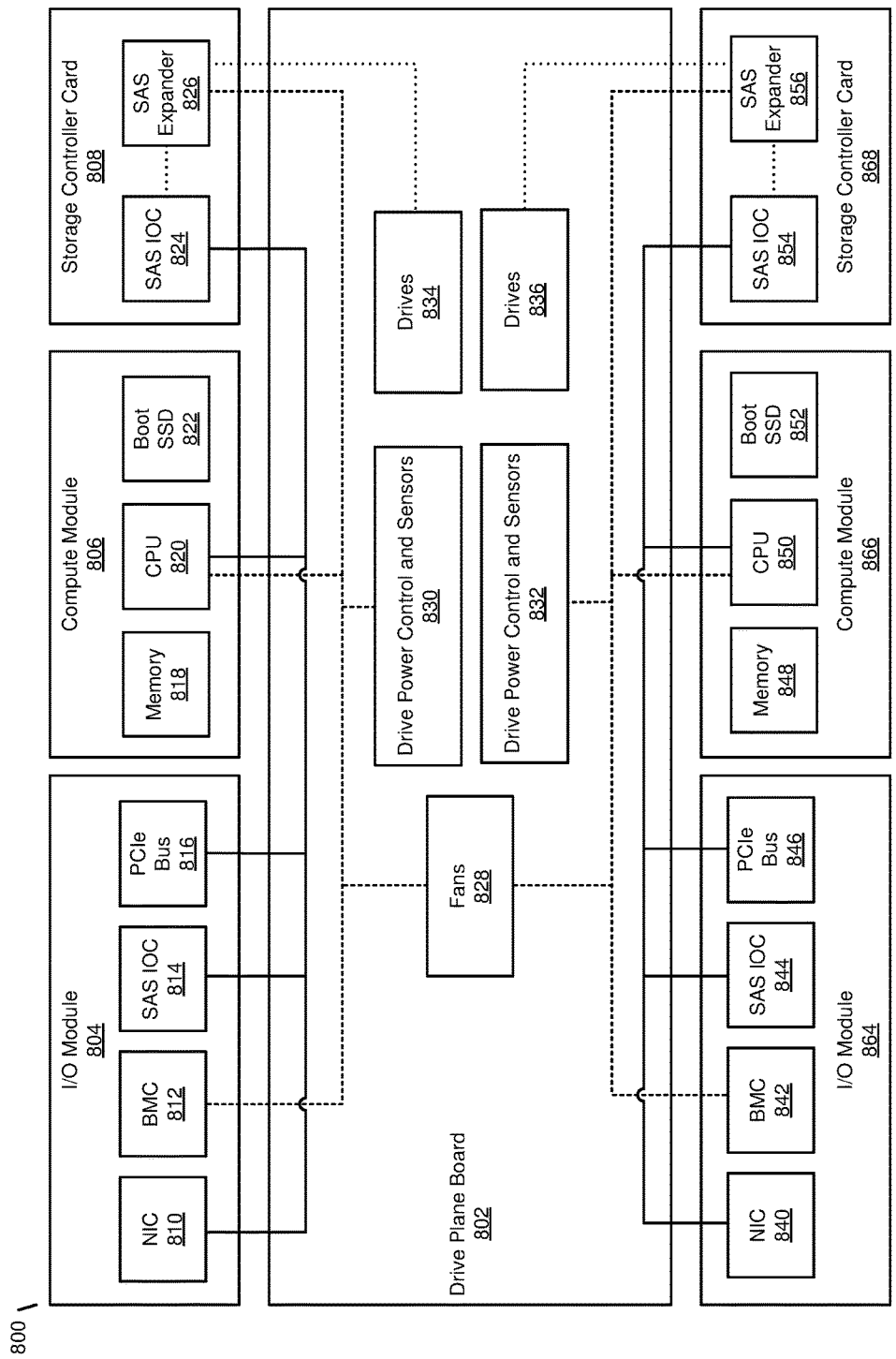
FIG. 8 is a block diagram of an exemplary server configuration for a storage-media-agnostic chassis.

FIG. 8 shows a block diagram of a system 800 for a dual storage server configuration for a storage-media-agnostic chassis. As illustrated in FIG. 8, a drive plane board 802 may be connected to one or more fans 828, drive power control and sensors 830 and/or 832, and/or drives 834 and/or 836. In some embodiments, drive power control and sensors 830 and/or 832 may monitor the state of the media-agnostic storage chassis and/or devices housed within the chassis, such as whether the chassis drawer is open and/or the temperature of the chassis and/or media-agnostic storage bays. In some embodiments, drives 834 may be housed in media-agnostic storage bay 110 and/or drives 836 may be housed in media-agnostic storage bay 120. In some examples, drives 834 and/or 836 may each represent 36 SAS drives or 36 SATA drives, for a total of 72 drives in system 800. In one embodiment, an input/output (I/O) module 804 may include a network interface controller (NIC) 810, a baseboard management controller (BMC) 812, SAS input/output controller (IOC) 814, and/or a peripheral component interconnect express (PCIe) bus 816. In some examples, BMC 812 may control fans 828. In one embodiment, a compute module 806 may include memory 818, a central processing unit (CPU) 820, and/or a boot solid state drive (SSD) 822. In some embodiments, compute module 806 may be an open compute project (OCP) microserver. In some embodiments, a storage controller card 808 may include a SAS IOC 824 and/or a SAS expander 826. In some embodiments, NIC 810, SAS IOC 814, CPU 820, and/or SAS IOC 824 may all be connected via PCIe connectors to PCIe bus 816. In one embodiment, BMC 812, CPU 820, and/or drive power control and sensors 830, may be connected to SAS expander 826. In some embodiments, BMC 812, CPU 820, and/or drive power control and sensors 830, may be connected to SAS expander 826 via eight lanes of PCIe generation 3 connectors. In some embodiments, SAS IOC 824 may be connected to SAS expander 826 via a SAS connection. For example, SAS IOC 824 may be connected to SAS expander 826 via eight lanes of twelve gigabyte SAS connections. In some embodiments, SAS expander 826 may be connected to drives 834 via a SATA connection. In other embodiments, SAS expander 826 may be connected to drives 834 via a SAS connection. For example, SAS expander 826 may be connected to drives 834 via thirty-six lanes of twelve gigabyte SAS connections and/or six gigabyte SATA connections.

Similarly, an I/O module 864 may include an NIC 840, BMC 842, SAS IOC 844, and/or PCIe bus 846, a compute module 866 may include memory 848, a CPU 850, and/or a boot SSD 852, and/or a storage controller card 868 may include a SAS IOC 854 and/or a SAS expander 856. The aforementioned components may be connected to one another and to the components on drive plane board 802 in a similar manner to the components hosted within I/O module 804, compute module 806, and/or storage controller card 808. In one embodiment, the only external connection between system 800 and other systems may be an ethernet link.

Figure 9:
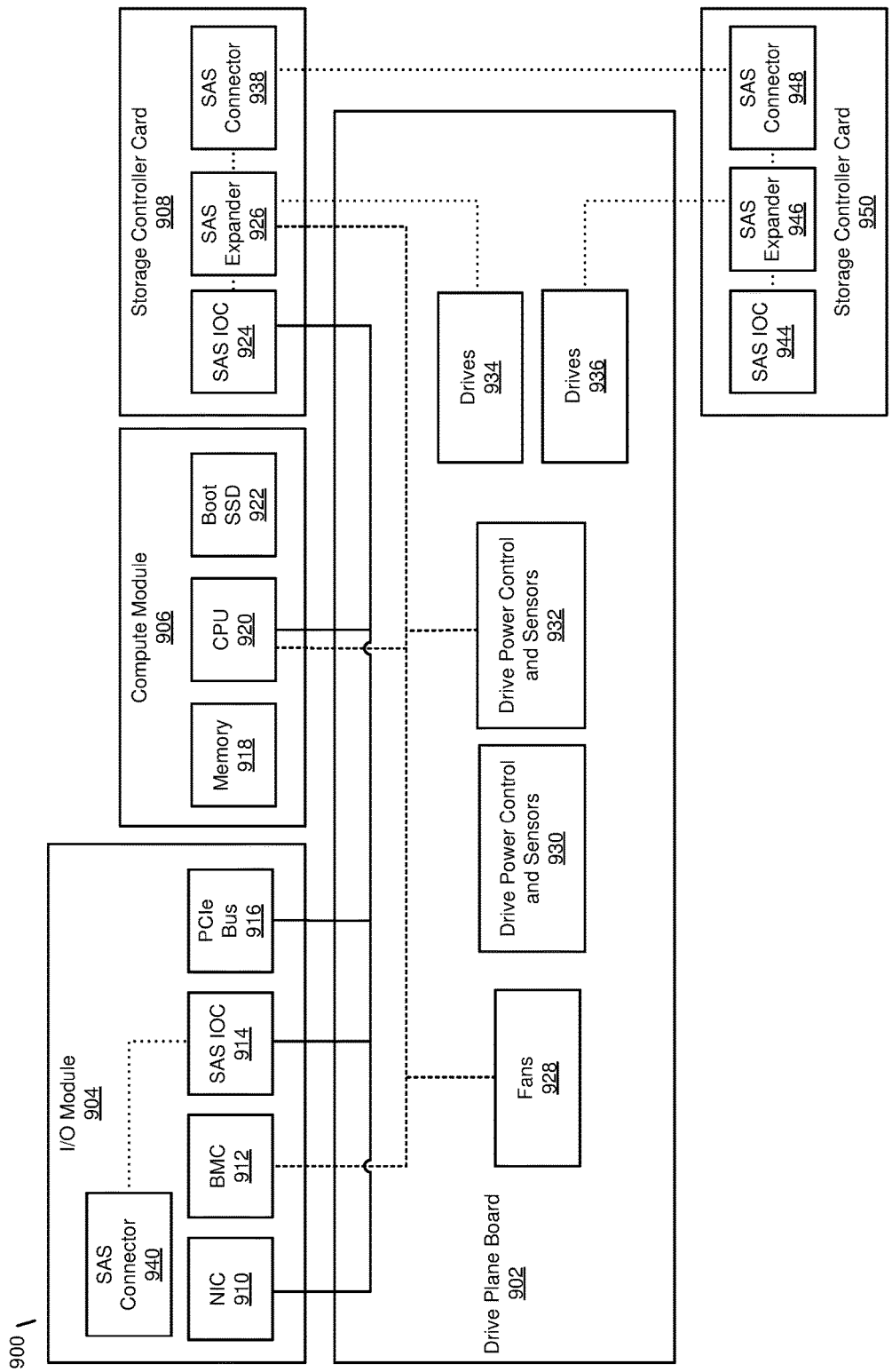
FIG. 9 is a block diagram of an additional exemplary server configuration for a storage-media-agnostic chassis.

FIG. 9 shows a block diagram of a system 900 for a single storage server configuration. In some embodiments, a single storage server configuration may be intended for applications that use a lower compute-to-storage ratio compared to applications that operate efficiently when hosted by a dual storage server configuration. In some embodiments, a single storage server configuration may serve as a head node for a cold storage configuration that includes multiple servers storing data that does not need to be frequently accessed.

As illustrated in FIG. 9, a drive plane board 902 may be connected to fans 928, drive power control and sensors 930, drive power control and sensors 932, drives 934, and/or drives 936. In some embodiments, drives 934 and/or 936 may represent media storage drives housed in media-agnostic storage bays. In some examples, drives 934 and/or 936 may each represent 36 SAS and/or SATA drives, for a total of 72 drives in system 900. In one embodiment, an I/O module 904 may include a SAS connector 940, an NIC 910, a BMC 912, a SAS IOC 914, and/or a PCIe bus 916. In some embodiments, a compute module 906 may include memory 918, a CPU 920, and/or a boot SSD 922. In some embodiments, a storage controller card 908 may include a SAS IOC 924, a SAS expander 926, and/or a SAS connector 938. In one embodiment, a storage controller card 950 may include a SAS IOC 944, a SAS expander 946, and/or a SAS connector 948. In some embodiments, NIC 910, SAS IOC 914, CPU 920, and/or SAS IOC 924 may all be connected via PCIe connectors to PCIe bus 916. In some embodiments, SAS connector 940 may be connected to SAS IOC 914 via a SAS connection. For example, SAS connector 940 may be connected to SAS IOC 914 via six lanes of twelve gigabyte SAS connections. In one embodiment, BMC 912, fans 928, drive power control and sensors 932, and/or SAS expander 926 may all be connected to CPU 920. In some embodiments, SAS expander 926 may be connected to SAS IOC 924, drives 934, and/or SAS connector 938. In some examples, SAS expander 926 may be connected to SAS IOC 924, drives 934, and/or SAS connector 938 via 12 gigabyte SAS connections. In one example, SAS expander 926 may be connected to SAS IOC 924 via eight lanes of SAS connections, to SAS connector 938 via four lanes, and/or to drives 934 via thirty-six lanes. Similarly, SAS expander 946 may be connected to SAS IOC 944, drives 936, and/or SAS connector 948. In some embodiments, SAS connector 938 may be connected to SAS connector 948.

Figure 10:
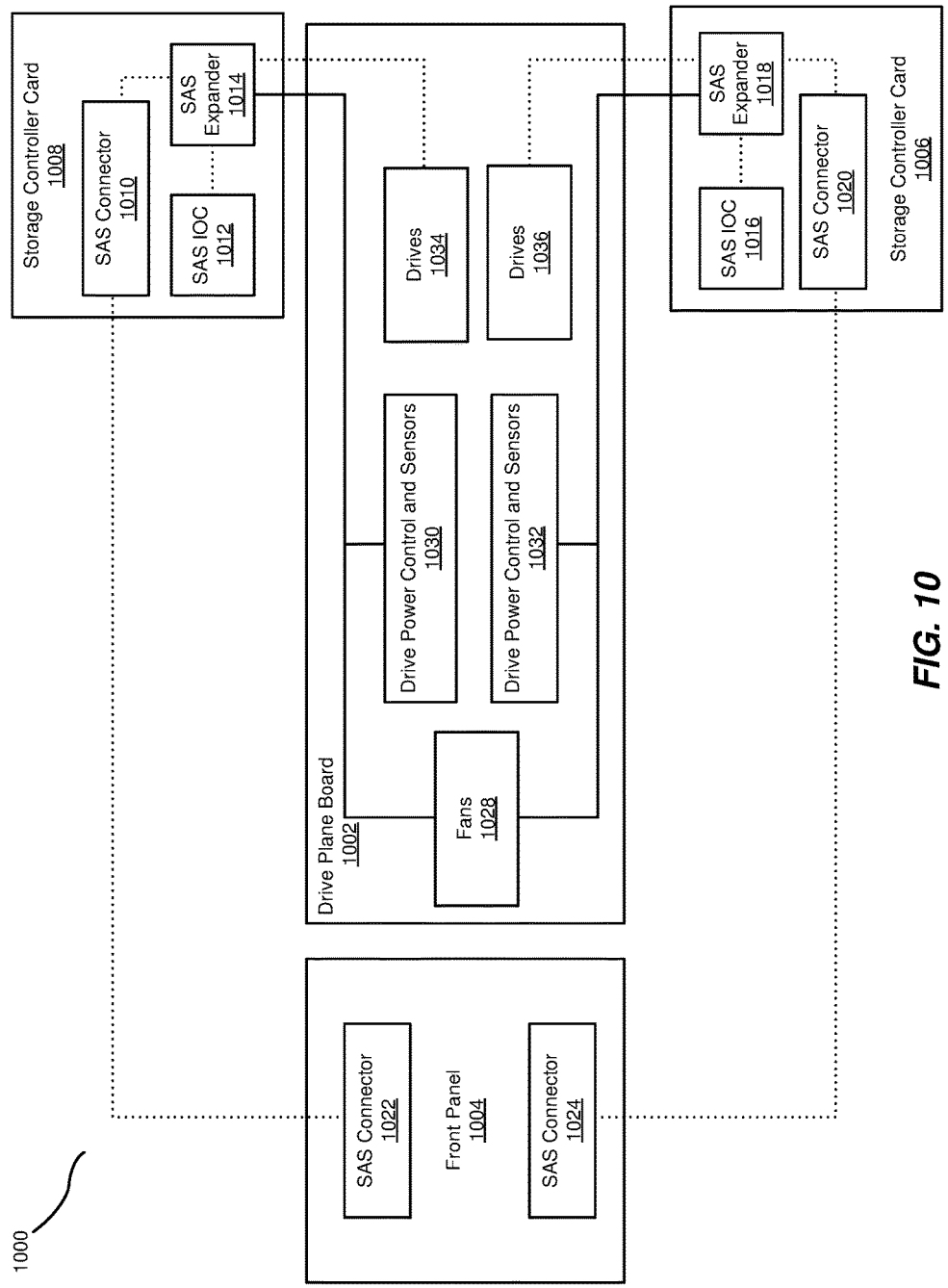
FIG. 10 is a block diagram of an additional exemplary server configuration for a storage-media-agnostic chassis.

FIG. 10 shows a block diagram of a system 1000 for a "just a bunch of disks" (JBOD) server configuration. In some embodiments, an external compute module may be connected to a JBOD server. For example, an external compute module may be connected via a SAS connector exposed at the front of the storage-media-agnostic chassis. In one embodiment, a drive plane board 1002 may be connected to fan 1028, drive power control and sensors 1030 and/or drive power control and sensors 1032, and/or drives 1034 and/or drives 1036. In some embodiments, drives 1034 and/or 1036 may represent media storage drives housed in media-agnostic storage bays. In some examples, drives 1034 and/or 1036 may each represent 36 SAS and/or SATA drives, for a total of 72 drives in system 1000. In one embodiment, a front panel 1004 may include a SAS connector 1022 and/or a SAS connector 1024. In some embodiments, a storage controller card 1008 may host a SAS connector 1010, a SAS IOC 1012, and/or a SAS expander 1014. Similarly, a storage controller card 1006 may include a SAS connector 1020, a SAS IOC 1016, and/or a SAS expander 1018.

In some embodiments, SAS expander 1014 and/or SAS expander 1018 may be connected to fans 1028. In one embodiment, SAS expander 1014 may be connected to drive power control and sensors 1030. Similarly, SAS expander 1018 may be connected to drive power control and sensors 1032. In one embodiment, SAS expander 1014 may be connected to SAS connector 1010, SAS IOC 1012, SAS connector 1022, and/or drives 1034. In some examples, SAS expander 1014 may be connected to SAS connector 1010 via four lanes of twelve gigabyte SAS connections, may be connected to SAS IOC 1012 via eight lanes of twelve gigabyte SAS connections, may be connected to SAS connector 1022 via a four lane mini-SAS high-density (HD) internal cable, and/or may be connected to drives 1034 via thirty-six lanes of twelve gigabyte SAS connections. In some embodiments, SAS expander 1018 may be connected to SAS connector 1020, SAS IOC 1016, SAS connector 1024, and/or drives 1036 in a similar fashion. In some embodiments, SAS IOC 1012 and/or SAS IOC 1016 may not be populated. In some embodiments, multiple JBOD servers may be used as nodes behind a head node that is configured as a single storage server and/or a JBOD server.

Figure 11:
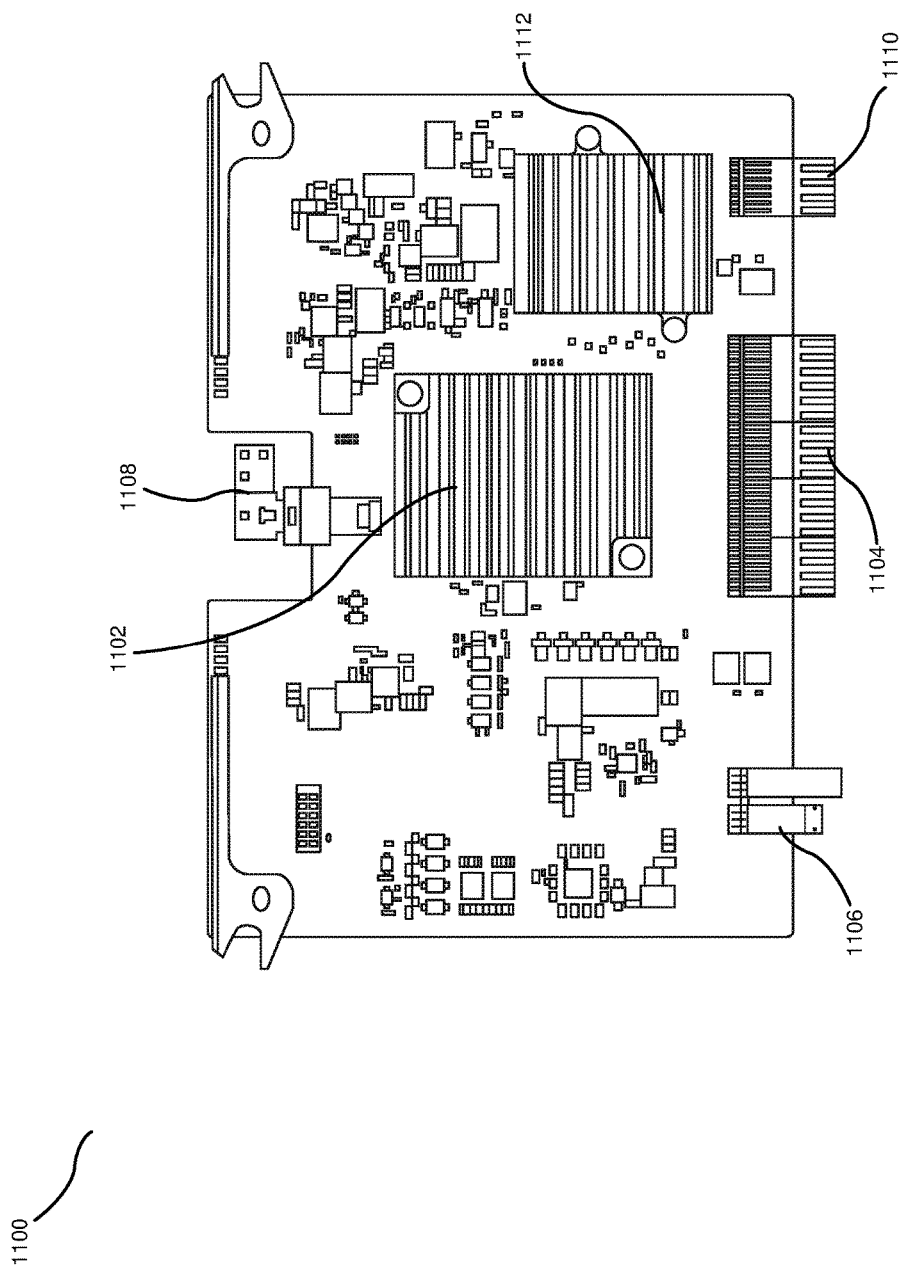
FIG. 11 is a top view of an exemplary storage controller card.

FIG. 11 is a top view of a storage controller card 1100. A storage-media-agnostic chassis may contain storage controller cards of different types and/or configurations depending on the configuration of the drives held in the storage-media-agnostic chassis. In one embodiment, storage controller card 1100 may include a SAS expander 1102, a drive and general input/output (GPIO) pin 1104, a power port 1106, a SAS connector 1108, a PCIe port 1110, and/or a SAS IOC 1112. In some embodiments, one or more storage controller cards within the storage-media-agnostic chassis may be reconfigured and/or replaced when the storage-media-agnostic chassis is changed into a different server configuration.

Figure 12:
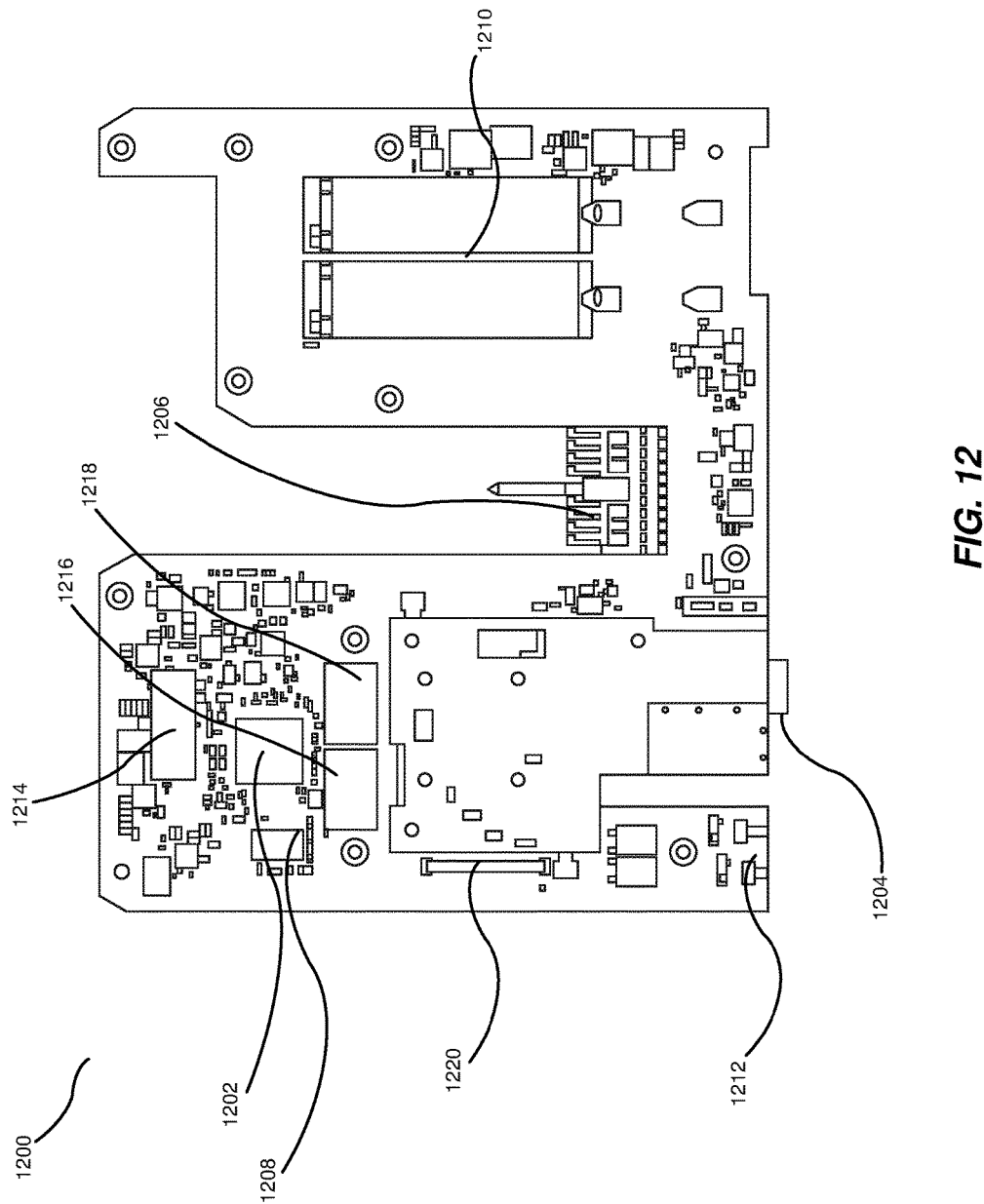
FIG. 12 is a top view of an exemplary input/output module.

FIG. 12 is a top view of an I/O module 1200. In some embodiments, an I/O module may be reconfigured and/or replaced when the storage-media-agnostic chassis is changed into a different server configuration. In one embodiment, I/O module 1200 may include a BMC 1202, a universal services bus (USB) port 1204, and/or a fusible panelboard (FDPB) connector 1206. In some embodiments, I/O module 1200 may include memory 1208. In one example, memory 1208 may be double data rate (DDR) memory. In some embodiments, I/O module 1200 may include a connector 1210. In one embodiment, connector 1210 may represent one or more M.2 connectors. In another embodiment, connector 1210 may represent a SAS IOC and/or one or more SAS connectors. In one example, an input/output module for a dual storage server configuration may include a SAS IOC and two SAS connectors while an input/output module for a single storage server configuration may instead include two M.2 connectors. In some embodiments, I/O module 1200 may include buttons 1212. In one example, buttons 1212 may represent a power button and/or a reset button. In some embodiments, I/O module 1200 may also include a trusted platform module (TPM) 1214, secure flash 1216, BMC flash 1218, and/or OCP mezzanine card connector 1220.

Figure 13:
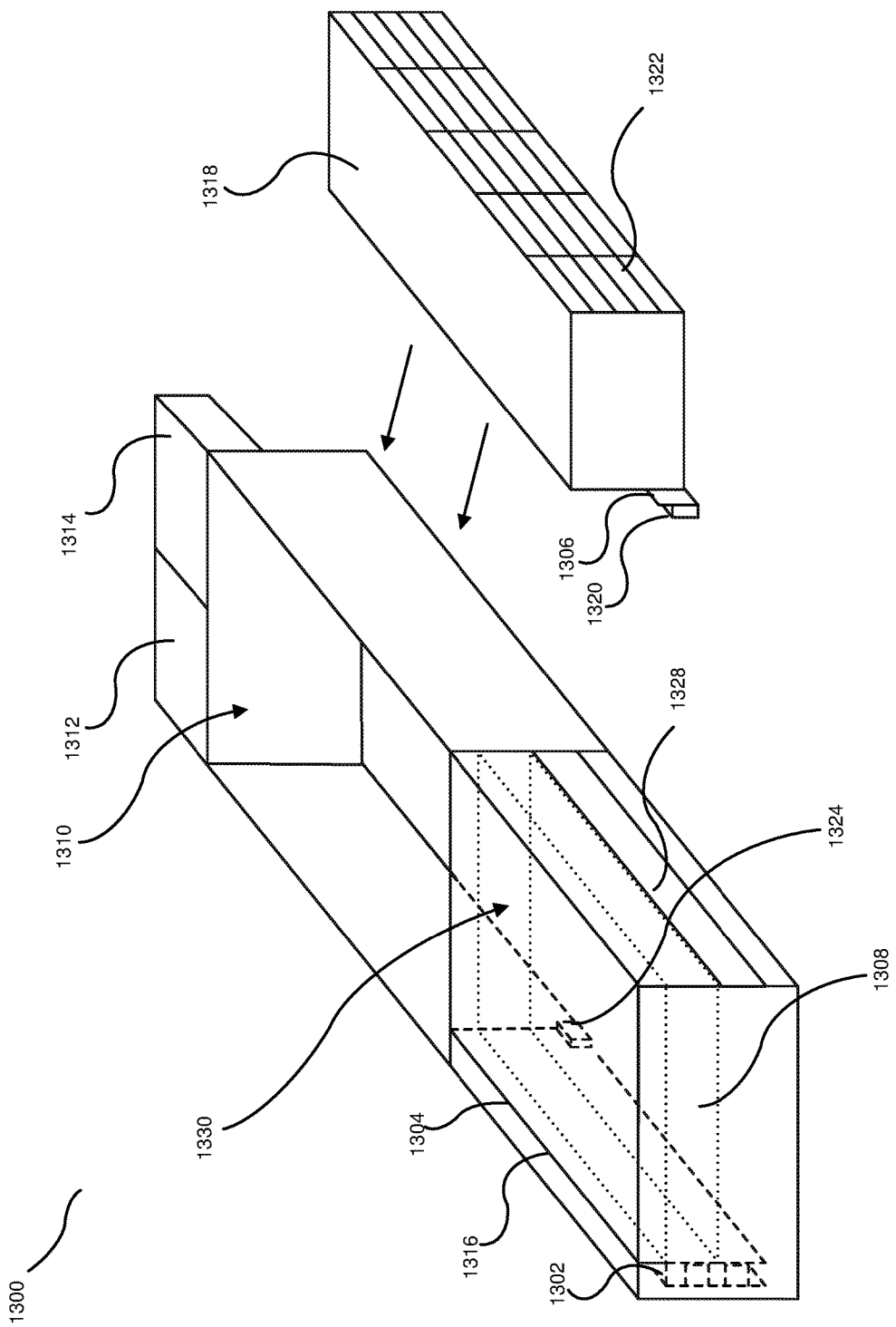
FIG. 13 is an isometric view of an additional exemplary storage-media-agnostic chassis.

In some embodiments, a storage-media-agnostic chassis may have a long tube-like shape with a large media-agnostic storage bay that is adapted to hold drives of many different form factors. FIG. 13 is an isometric view of a storage-media-agnostic chassis 1300. In some embodiments, storage-media-agnostic chassis 1300 may have a media-agnostic storage bay 1310 that is adapted to hold a module 1318 and/or media drives of various dimensions. In some embodiments, a cable track and/or rail (not pictured in FIG. 13) may run along the back of storage-media-agnostic chassis 1300.

In some embodiments, storage-media-agnostic chassis 1300 may have a compute bay 1330 that is adapted to hold various components of a compute module, such as a server card 1308. In one embodiment, compute bay 1330 may include a slot 1328 that is adapted to hold an additional server card, battery-backed memory, and/or any other type of component that adds functionality to the compute module. In one embodiment, server card 1308 may be a 1P server card. In some embodiments, compute bay 1330 may house an embedded system-on-chip (SOC) compute card. In one example, the compute card may be an 8-core BROADWELL-DE compute card. In other examples, the compute card may be high-compute or no-compute. In some embodiments, connectors 1320 and 1324 may enable module 1318, when inserted within media-agnostic storage bay 1310, to connect to components in compute bay 1330. In one embodiment, fan 1312 and/or fan 1314 may be attached to one end of storage-media-agnostic chassis 1300.

In some embodiments, storage-media-agnostic chassis 1300 may include multiple printed circuit boards (PCBs). For example, storage-media-agnostic chassis 1300 may include a PCB 1302 that connects to a PCB 1304 via a mezzanine card 1316, such as a 10/40 gigabyte mezzanine card. In some examples, mezzanine card 1316 may be an OCP 2.0 mezzanine card dimensioned to connect parallel PCBs in a stacked configuration. In one embodiment, module 1318 may include a PCB 1306 that connects to PCB 1304 via a connector 1320 and/or a connector 1324 (each of which may, in some examples, represent board-to-board connectors). In some embodiments, PCB 1304 may be adapted to connect to one or more components within compute bay 1330 and/or PCB 1306 may be adapted to connect to one or more drives within module 1318. In some embodiments, any or all of PCB 1302, 1304, and/or 1306 may function as backplanes. In some embodiments, storage-media-agnostic chassis 1300 may contain PCBs and/or connectors of different dimensions based on the dimensions of drives to be housed in storage-media-agnostic chassis 1300. For example, storage-media-agnostic chassis 1300 may use PCBs and/or connectors of larger dimensions when housing smaller drives such as M.2 drives in order to enable technicians to easily access the drives without reaching far into storage-media-agnostic chassis 1300. In some embodiments, PCBs 1302, 1304, and/or 1306 may support backplane Ethernet connections.

In some embodiments, module 1318 may be adapted to hold a number of drives 1322. In some examples, module 1318 may have a 2.5" by 2.5" form factor along its short sides. In other examples, module 1318 may have other form factors. In some examples, module 1318 may be adapted to hold either forty 7-millimeter (mm) SSDs, eighty M.2 SSDs, or twenty 15 mm SSDs. In one embodiment, connector 1320 may receive and/or provide signal and/or power connections between module 1318 and media-agnostic storage bay 1310 (via, e.g., connector 1324). In one embodiment, drives may connect to module 1318 via blind mate connectors. For example, module 1318 may include internal blind mate connectors adapted to connect M.2 drives to PCB 1306. In some embodiments, module 1318 may be reconfigurable to enable drives to be placed in a variety of different arrangements based on the needs of the drives. For example, module 1318 may be adapted to house drives placed in a staggered arrangement to improve airflow and/or cooling and/or reduce power requirements. In some embodiments, module 1318 may house a PCIe switch, SAS controller, and/or SATA controller. In one embodiment, module 1318 may be reconfigurable such that a PCIe switch, SAS controller, SATA controller, and/or other connector may be removed and replaced with a connector of a different type.

In one embodiment, storage-media-agnostic chassis may be adapted to support a variety of connection types and/or formats, including but not limited to PCIe, SATA, and/or SAS. In some embodiments, storage-media-agnostic chassis 1300 may include a BMC that is adjacent to and/or within compute bay 1330. In other embodiments, storage-media-agnostic chassis 1300 may include a BMC adjacent to and/or within media-agnostic storage bay 1310. In some embodiments, storage-media-agnostic chassis 1300 may be constructed to minimize cabling between components.

Figure 14A:
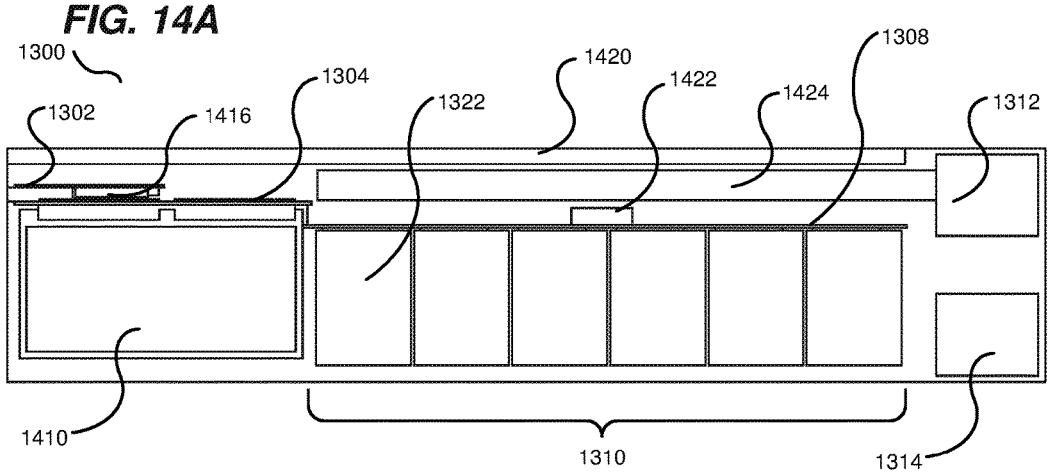
FIG. 14A is a top view of an additional exemplary storage-media-agnostic chassis.

FIG. 14A is a top view of storage-media-agnostic chassis 1300 with module 1318 inserted into media-agnostic storage bay 1310. As shown in this figure, module 1318 may be connected to various components of compute bay 1330 (e.g., server card 1308) via connectors 1320 and 1324. In one embodiment, storage-media-agnostic chassis 1300 may also include a rail 1420 and/or a cable track 1424. In some embodiments, rail 1420 and/or cable track 1424 may enable drives and/or other components stored within media-agnostic storage bay 1310 to be hot swapped (i.e., removed and/or replaced without being powered down). In one embodiment, storage-media-agnostic chassis 1300 may include a connector 1422 that is within media-agnostic storage bay 1310 and/or that is connected to PCB 1306. In one embodiment, connector 1422 may represent a PCIe switch. Additionally or alternatively, connector 1422 may represent a SAS controller and/or a SATA controller. In some embodiments, connector 1422 may be removable in order to enable one type of connector to be replaced with another type of connector that interfaces with a different type of storage drive. In some examples, connector 1422 may form a part of module 1318.

Figure 14B:
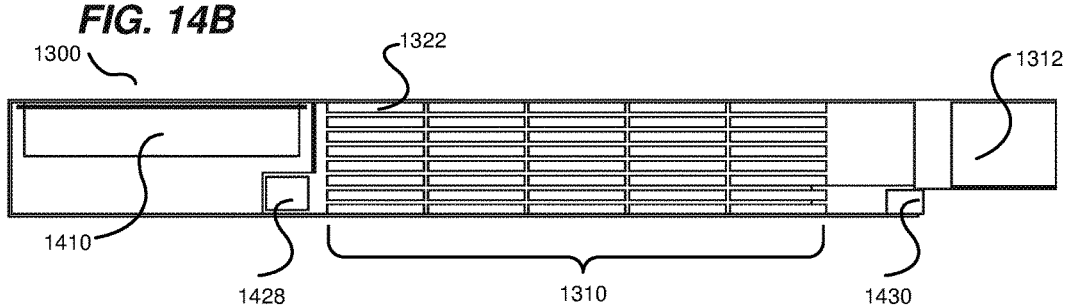
FIG. 14B is a side view of an additional exemplary storage-media-agnostic chassis.

FIG. 14B is a side view of storage-media-agnostic chassis 1300 with module 1318 inserted into media-agnostic storage bay 1310 and connected via connectors 1320 and 1324. In one embodiment, storage-media-agnostic chassis 1300 may contain a power input 1430. In some examples, drive 1322 may be removable from media-agnostic storage bay 1310 via the side of storage-media-agnostic chassis 1300.

Figure 14C:
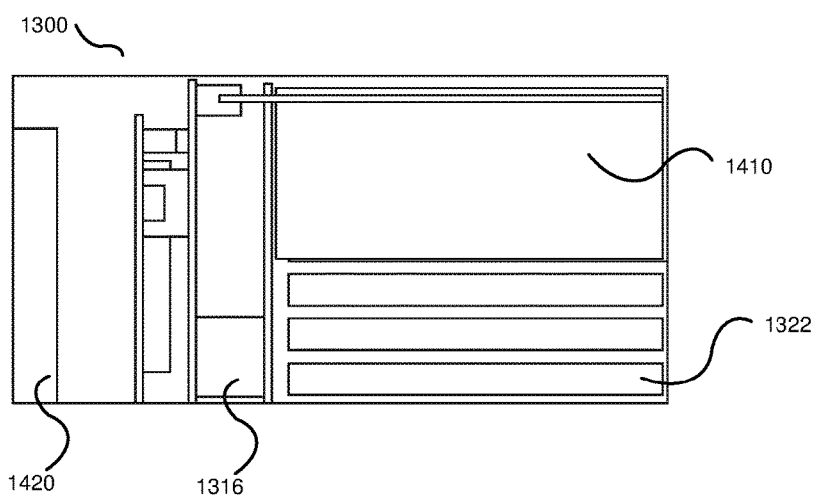
FIG. 14C is an end view of an additional exemplary storage-media-agnostic chassis.

FIG. 14C is an end view of storage-media-agnostic chassis 1300 with module 1318 inserted into media-agnostic storage bay 1310 and connected via connectors 1320 and 1324. As detailed above, in some examples drive 1322 may be a 7 mm drive.

In some embodiments, storage-media-agnostic chassis 1300 may be fully integrated, requiring no external head node. In some examples, storage-media-agnostic chassis 1300 may be dimensioned to enable dense packing on server racks, enabling a high density of storage space per rack. In some embodiments, storage-media-agnostic chassis 1300 may have a high compute-to-flash ratio compared to other types of chasses, enabling a high degree of granularity in configuration. In some embodiments, storage-media-agnostic chassis 1300 may have a small failure domain, improving the reliability of systems that depend on drives housed within storage-media-agnostic chassis 1300.

Figure 15:
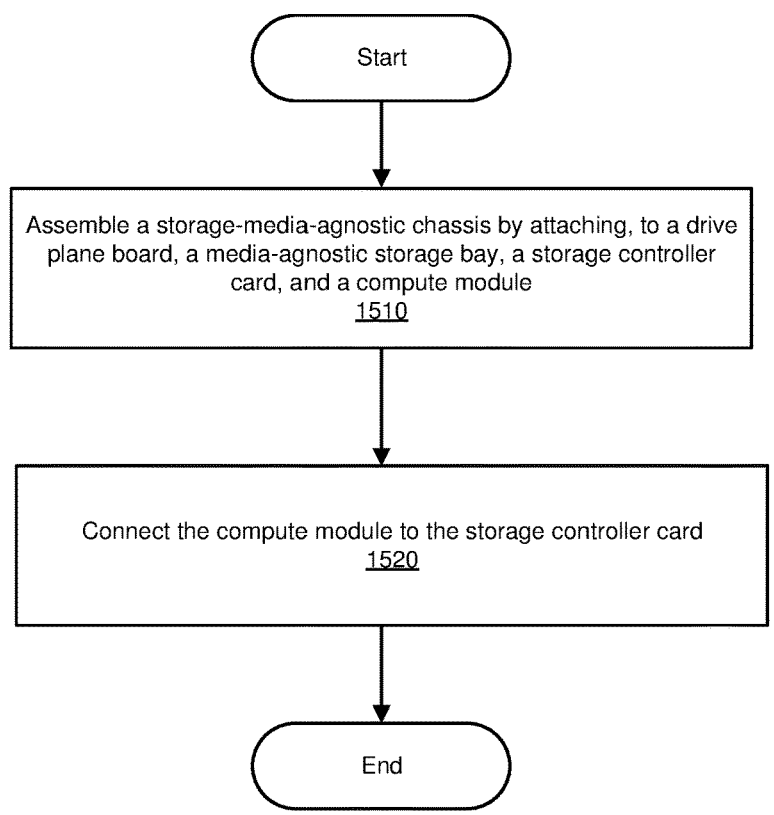
FIG. 15 is a flow diagram of an exemplary method for assembling storage-media-agnostic chasses.

FIG. 15 is a flow diagram of an example method 1500 for assembling a storage-media-agnostic chassis. At step 1510, the systems described herein may assemble a storage-media-agnostic chassis by attaching, to a drive plane board, a media-agnostic storage bay, a storage controller card, and a compute module. At step 1520, the systems described herein may connect the compute module to the storage controller card. In some embodiments, the compute module may be internal to the storage-media-agnostic chassis, while in other embodiments, the compute module may be attached to the drive plane board and/or storage controller card via one or more cables.

In some embodiments, the systems described herein may enable a technician to reconfigure the storage-media-agnostic chassis into a variety of different server configurations. For example, the systems described herein may enable a technician to reconfigure the storage-media-agnostic chassis into a single server, dual server, and/or JBOD configuration by removing and replacing and/or reconfiguring drives, device-holding modules, storage controller cards, I/O modules, and/or compute modules. In one example, the systems described herein may facilitate the reconfiguration of the storage-media-agnostic chassis by enabling a technician to remove one or more device-holding modules from one or more media-agnostic storage bays and insert one or more additional device-holding modules with a different configuration of media storage drives into the media-agnostic storage bays. For example, the systems described herein may enable a technician to remove all modules holding M.2 drives from the media-agnostic storage bays and replace those modules with modules holding SAS drives. In this example, the systems described herein may then facilitate the ability of a technician to reconfigure and/or replace the I/O module, compute module, and/or storage card controller to be compatible with SAS drives rather than M.2 drives. In some examples, the systems described herein may be designed for easy access that enables a technician to efficiently add, remove, and/or change connections between various components of the storage-media-agnostic chassis when changing the configuration.

In some embodiments, the storage-media-agnostic chassis may only hold media storage devices of one type in a given media-agnostic storage bay at a time. For example, the storage-media-agnostic chassis may only hold either SATA drives or SAS drives in each bay. In other embodiments, the storage-media-agnostic chassis may hold media storage devices of multiple types in the same bay simultaneously. In some embodiments, a device-holding module may be adapted to hold a single type of media storage devices. In other embodiments, a device-holding module may be adapted to hold multiple types of media storage devices.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a media-agnostic storage bay that:
        is adapted to house media storage devices of a plurality of different media storage device types with different physical dimensions;
        is reconfigurable via removing at least one media storage device of a media storage device type from the media-agnostic storage bay and inserting at least one media storage device of an additional media storage device type into the media-agnostic storage bay;
        is dimensioned to simultaneously store a plurality of media storage devices; and
        is adapted to house a plurality of different types of connectors adapted to simultaneously connect to the plurality of media storage devices;
    a storage controller card adapted to control at least one media storage device housed in the media-agnostic storage bay;
    a compute module that is separate from but removably attached to the media-agnostic storage bay and that is connected to the storage controller card; and
    a backplane that connects to the media storage device housed in the media-agnostic storage bay and to the compute module via at least one connector that facilitates communication between the media storage device housed in the media-agnostic storage bay and the compute module.

2. The apparatus of claim 1, wherein the media-agnostic storage bay is adapted to simultaneously house media storage devices of a plurality of different media storage device types with different physical dimensions.

3. The apparatus of claim 1, further comprising a device-holding module that is adapted to hold a plurality of media storage devices in a predetermined configuration within the media-agnostic storage bay.

4. The apparatus of claim 3, wherein the device-holding module is adapted to hold media storage devices of a specific media storage device type within the plurality of different media storage device types.

5. The apparatus of claim 3, wherein the device-holding module contains a non-conductive fluid.

6. The apparatus of claim 3, wherein the device-holding module comprises at least one latch adapted to hold a single media storage device in place when closed and enable removal of the single media storage device when open.

7. The apparatus of claim 1, further comprising an input/output module adapted to manage at least one configuration of media storage devices held within the media-agnostic storage bay.

8. The apparatus of claim 1, wherein the storage controller card is configured to control a specific type of media storage device.

9. The apparatus of claim 1, wherein the media-agnostic storage bay is adapted to enable the media storage device housed in the media-agnostic storage bay to be removed from the media-agnostic storage bay without the media storage device housed in the media-agnostic storage bay being powered down.

10. The apparatus of claim 1, wherein the media storage device housed in the media-agnostic storage bay comprises a flash storage device.

11. The apparatus of claim 1, further comprising at least one drive plane board connected to the media storage device housed in the media-agnostic storage bay, the storage controller card, the compute module, and at least one fan module.

12. A system comprising:
    a storage-media-agnostic chassis that comprises:
        a media-agnostic storage bay that:
            is adapted to house media storage devices of a plurality of different media storage device types with different physical dimensions;
            is reconfigurable via removing at least one media storage device of a media storage device type from the media-agnostic storage bay and inserting at least one media storage device of an additional media storage device type into the media-agnostic storage bay;
            is dimensioned to simultaneously store a plurality of media storage devices; and
            is adapted to house a plurality of different types of connectors adapted to simultaneously connect to the plurality of media storage devices;

a storage controller card adapted to control at least one media storage device housed in the media-agnostic storage bay;

a compute module that is separate from but removably attached to the media-agnostic storage bay and that is connected to the storage controller card; and a backplane that connects to the media storage device housed in the media-agnostic storage bay and to the compute module via at least one connector that facilitates communication between the media storage device housed in the media-agnostic storage bay and the compute module;

a rack adapted to house the storage-media-agnostic chassis; and at least one cable adapted to provide at least one of power or network connectivity to the storage-media-agnostic chassis.

13. The system of claim 12, further comprising a device-holding module that is adapted to:

hold a plurality of media storage devices in a predetermined configuration within the media-agnostic storage bay; and interface with the media-agnostic storage bay such that each media storage device held by the device-holding module is connected to the backplane via at least one connector.

14. The system of claim 12, further comprising an input/output module that comprises the storage controller card and the compute module.

15. A method comprising:

assembling a storage-media-agnostic chassis by attaching, to a drive plane board:

a media-agnostic storage bay that:
is adapted to house media storage devices of a plurality of different media storage device types with different physical dimensions;
is reconfigurable via removing at least one media storage device of a media storage device type from the media-agnostic storage bay and inserting at least one media storage device of an additional media storage device type into the media-agnostic storage bay;
is dimensioned to simultaneously store a plurality of media storage devices; and
is adapted to house a plurality of different types of connectors adapted to simultaneously connect to the plurality of media storage devices;

a storage controller card adapted to control at least one media storage device housed in the media-agnostic storage bay; and a compute module that is separate from the media-agnostic storage bay; and connecting the compute module to the storage controller card.

16. The method of claim 15, further comprising reconfiguring the media-agnostic storage bay by removing at least one media storage device of a media storage device type from the media-agnostic storage bay and inserting at least one media storage device of an additional media storage device type into the media-agnostic storage bay.

17. The method of claim 16, wherein reconfiguring the media-agnostic storage bay comprises:

removing a device-holding module that holds the at least one media storage device of the media storage device type in a predefined configuration; and inserting an additional device-holding module that holds the at least one media storage device of the additional media storage device type in an additional predefined configuration.

18. The method of claim 16, wherein reconfiguring the media-agnostic storage bay comprises:

configuring a device-holding module to hold a set of media storage devices in a predefined physical arrangement;

inserting the set of media storage devices into the device-holding module in the predefined physical arrangement; and inserting the device-holding module into the media-agnostic storage bay.

19. The method of claim 16, wherein reconfiguring the media-agnostic storage bay comprises reconfiguring a storage controller card adapted to control at least one media storage device housed in the media-agnostic storage bay to control the media storage device of the additional media storage device type.

20. The method of claim 16, wherein reconfiguring the media-agnostic storage bay comprises reconfiguring an input/output module to manage a configuration of media storage devices held within the media-agnostic storage bay that comprises the media storage device of the additional media storage device type.

* * * * *